US012462441B2

(12) United States Patent
Bean

(10) Patent No.: US 12,462,441 B2
(45) Date of Patent: Nov. 4, 2025

(54) ITERATIVE IMAGE GENERATION FROM TEXT

(71) Applicant: Sony Interactive Entertainment Inc., Tokyo (JP)

(72) Inventor: Celeste M.B. Bean, San Francisco, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 221 days.

(21) Appl. No.: 18/186,752

(22) Filed: Mar. 20, 2023

(65) Prior Publication Data
US 2024/0320867 A1    Sep. 26, 2024

(51) Int. Cl.
*G06T 11/60*   (2006.01)
*G06F 16/532*  (2019.01)
*G06N 3/08*    (2023.01)
*G06T 11/00*   (2006.01)
*G06F 40/56*   (2020.01)

(52) U.S. Cl.
CPC ............ *G06T 11/00* (2013.01); *G06F 16/532* (2019.01); *G06N 3/08* (2013.01); *G06T 11/60* (2013.01); *G06F 40/56* (2020.01); *G06T 2207/20092* (2013.01)

(58) Field of Classification Search
None
See application file for complete search history.

(56) References Cited

U.S. PATENT DOCUMENTS

| 10,049,477 | B1* | 8/2018 | Kokemohr ............ G06T 11/001 |
| 2007/0234284 | A1 | 10/2007 | Tanner et al. |
| 2012/0323930 | A1 | 12/2012 | Kennberg et al. |
| 2020/0105038 | A1* | 4/2020 | Usuki ..................... G06F 40/56 |
| 2020/0356591 | A1 | 11/2020 | Yada et al. |

(Continued)

FOREIGN PATENT DOCUMENTS

| CN | 102438164 A | 5/2012 |
| CN | 108345692 B | 7/2020 |

(Continued)

OTHER PUBLICATIONS

Huang, Qiuyuan; Turbo Learning for Captionbot and Drawingbot; May 2018; NIPS'18: Proceedings of the 32nd International Conference on Neural Information Processing Systems; p. 1-13; https://arxiv.org/pdf/1805.08170v1 (Year: 2018).*

(Continued)

*Primary Examiner* — Joni Hsu
(74) *Attorney, Agent, or Firm* — Fish & Richardson P.C.

(57) ABSTRACT

Methods and systems are presented for automatically identifying additional descriptors of an image generated by a text-to-image generator from an initial prompt. The additional descriptors are either incorporated into the initial prompt or made into a new prompt in order to produce another image from the text-to-image generator. The initial prompt and additional descriptors can describe visual features represented in images including content, artistic styles, visual perspectives, and other visible attributes of images. The additional descriptors can be incorporated into the initial prompt by replacing or supplementing existing descriptors. Subsequent images generated by the text-to-image generator can be used to iteratively produce additional descriptors.

20 Claims, 9 Drawing Sheets

(56) References Cited

U.S. PATENT DOCUMENTS

| | | | |
|---|---|---|---|
| 2023/0230198 A1* | 7/2023 | Zhang | G06T 11/60 |
| | | | 382/276 |
| 2024/0012992 A1* | 1/2024 | Tamm | G06F 40/197 |
| 2024/0169479 A1* | 5/2024 | Wang | G06T 3/4053 |
| 2024/0296535 A1* | 9/2024 | Bakunov | G06N 20/00 |
| 2024/0296606 A1* | 9/2024 | Smetanin | H04L 51/10 |

FOREIGN PATENT DOCUMENTS

| | | |
|---|---|---|
| TW | 201617947 A | 5/2016 |
| TW | 201941163 A | 10/2019 |
| TW | 202123131 A | 6/2021 |

OTHER PUBLICATIONS

Hertz et al., "Prompt-to-Prompt Image Editing with Cross Attention Control", Cornell University Library, Aug. 2, 2022, 19 pages.

Oppenlaender et al., "Prompting AI Art: An Investigation into the Creative Skill of Prompt Engineering", Cornell University Library, Mar. 13, 2023, 42 pages.

PCT/US2024/019536 , "International Search Report and Written Opinion", Jun. 21, 2024, 11 pages.

Zhao et al., "Visual Spatial Description: Controlled Spatial-Oriented Image-to-Text Generation", Proceedings of the 2022 Conference on Empirical Methods in Natural Language Processing,, Oct. 26, 2022, 13 pages.

TW113107203 , "Office Action", Sep. 2, 2024, 30 pages.

\* cited by examiner

ITERATIVE IMAGE GENERATION FROM TEXT

CROSS-REFERENCES TO RELATED APPLICATIONS

Not Applicable

STATEMENT AS TO RIGHTS TO INVENTIONS MADE UNDER FEDERALLY SPONSORED RESEARCH AND DEVELOPMENT

Not Applicable

BACKGROUND

The ability to perform creative tasks using Artificial Intelligence (AI) and Machine Learning (ML) is increasing dramatically as the relevant technology improves and the availability of different types of training data continues to grow. Likewise, the access to perform such tasks continues to expand as costs associated with processing and bandwidth continue to decrease, which in turn produces more data from which such techniques can continue to improve at an ever-increasing pace. Accordingly, as time goes on, highly detailed creative works, ranging from the visual arts, to writing, to music, and beyond, can be produced in a fraction of the time. It is therefore desirable to develop new techniques and systems that harness these capabilities and make them more accessible to new users.

BRIEF SUMMARY

Embodiments of the present disclosure relate to techniques for iteratively generating images from text inputs. In an embodiment, a method of automated text-to-image generation is described. The method can include receiving a first image generated by an automated text-to-image generator from an initial text prompt, wherein the initial text prompt comprises a first set of words. The method can further include receiving a text description of the first image, wherein the text description comprises a subset of words that are not in the first set of words. The method can further include generating a second text prompt comprising a second set of words selected from the first set of words and the subset of words. The method can further include modifying the second text prompt in response to user input. The method can further include submitting the modified second text prompt to the automated text-to-image generator. The method can further include receiving a second image generated by the automated text-to-image generator from the modified second text prompt.

In an example, the first image can be received with a plurality of images generated by the automated text-to-image generator from the initial text prompt. The subset of words may describe visual features represented by each image of the plurality of images. In an example, the method can further include receiving a selection of the first image from the plurality of images. In a further example, the text description can be received in response to the selection of the first image.

In an example, the method can further include displaying an alternative word related to a word in the second text prompt and an option to replace the word in the second text prompt with the alternative word. In a further example, the second text prompt can be modified in response to receiving a selection of the option. In an example, generating the second text prompt can include displaying the subset of words and an option to add one or more words from the subset of words to the initial text prompt or replace a word in the initial text prompt with the one or more words from the subset of words.

In an example, the first set of words describe visual features represented by the first image, and the automated text-to-image generator uses the first set of words to generate the visual features in the first image. In a further example, the subset of words can describe additional details of the visual features in the first image, additional visual features in the first image, or both. The visual features can include visual content, visual styles, and visual perspectives generated by the automated text-to-image generator. In an example, the subset of words are selected from a category of words that describe the visual content, the visual styles, or the visual perspectives generated by the automated text-to-image generator.

In an example, the method may further include automatically tendering the first image to an image-to-text model. In a further example, the text description can be generated by the image-to-text model from the first image. In another example, the first image can be generated by the automated text-to-image generator using a latent diffusion model. In an example, the first set of words can represent instructions to modify an initial image, and the first image can be further generated by modifying the initial image based on the instructions. In an example, the method can further include receiving a second text description of the second image. The second text description can include a second subset of words that are not in the modified second text prompt.

In an embodiment, a computer system for generating images from text is described. The computer system can include one or more processors and one or more memories storing computer-readable instructions that, upon execution by at least one of the one or more processors, configure the computer system to receive a first image generated by an automated text-to-image generator from an initial text prompt including a first set of words. The execution of the computer-readable instructions may further configure the computer system to receive a text description of the first image, wherein the text description comprises a subset of words that are not in the first set of words. The execution of the computer-readable instructions may further configure the computer system to generate a second text prompt comprising a second set of words selected from the first set of words and the subset of words. The execution of the computer-readable instructions may further configure the computer system to modify the second text prompt in response to user input. The execution of the computer-readable instructions may further configure the computer system to submit the modified second text prompt to the automated text-to-image generator. The execution of the computer-readable instructions may further configure the computer system to receive a second image generated by the automated text-to-image generator from the modified second text prompt.

In an example, the execution of the computer-readable instructions further configures the computer system to provide a user interface to an electronic device. The user interface can be configured to receive the initial text prompt and the user input from a user of the electronic device. In an example, the computer system and the electronic device are communicably coupled via one or more networks. In an example, the execution of the computer-readable instructions further configures the computer system to cause the user interface to display the first image and the second image to the user. In an example, the execution of the computer-readable instructions further configures the computer system to cause the user interface to display the subset of words and an option to add one or more words from the subset of words to the initial text prompt or replace a word in the initial text prompt with the one or more words from the subset of words. In an example, the user interface is further configured to access an initial image on the electronic device and the first image is generated by modifying the initial image based on the initial text prompt.

In an embodiment, one or more non-transitory computer-readable storage media storing instructions that, upon execution on a computer system, cause the computer system to perform operations including receiving a first image generated by an automated text-to-image generator from an initial text prompt, wherein the initial text prompt comprises a first set of words. The operations can further include receiving a text description of the first image, wherein the text description comprises a subset of words that are not in the first set of words. The operations can further include generating a second text prompt comprising a second set of words selected from the first set of words and the subset of words. The operations can further include modifying the second text prompt in response to user input. The operations can further include submitting the modified second text prompt to the automated text-to-image generator. The operations can further include receiving a second image generated by the automated text-to-image generator from the modified second text prompt.

In an example, the first image can be received with a plurality of images generated by the automated text-to-image generator from the initial text prompt. The operations can further include receiving a selection of a subset of the plurality of images including the first image. In an example, the subset of words describe visual features represented in each image of the subset of the plurality of images. In an example, the text description is received in response to the selection of the subset of the plurality of images.

DETAILED DESCRIPTION

Figure 1:
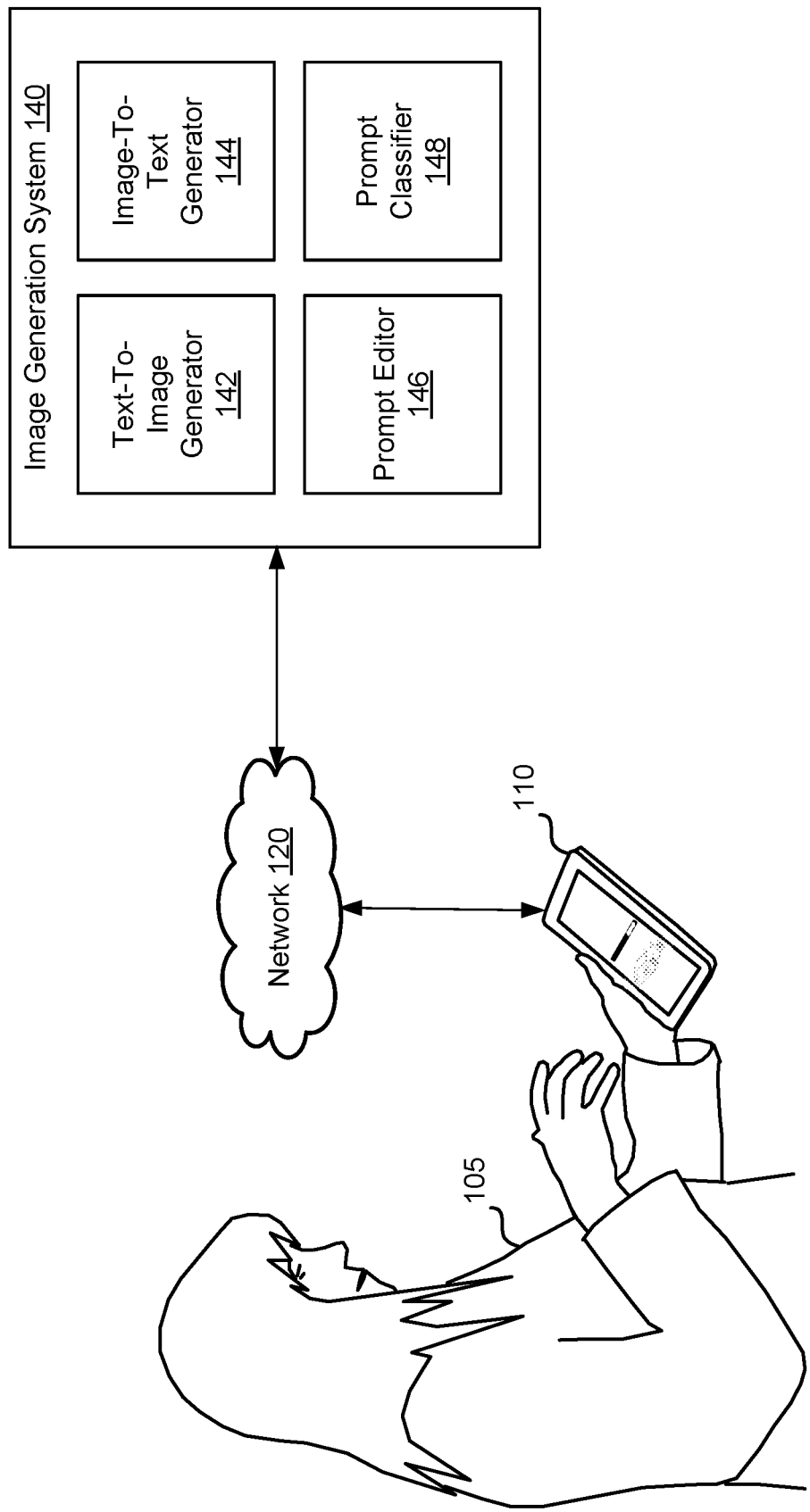
FIG. 1 illustrates an example of an image generation system for iteratively generating images from text according to embodiments of the present disclosure.

Generally, systems and methods for iteratively generating images from text are described. In an example, the process of generating a desired image from text is improved by providing feedback and suggestions for improving and enhancing the text from which the image is generated. The provision of such feedback and suggestions need not involve complicated or overly generalized explanations of technical AI/ML principles or a detailed analysis of a particular text prompt to identify possible deficiencies. Nor must it be tailored to any particular image generation system or technology. Instead, the feedback and suggestions may be obtained from the generated images themselves.

For instance, a method of iteratively improving images generated from text can include generating a first image from an initial text prompt describing the desired features to be illustrated in the generated image. Subsequently, the first image may be used to generate a description of the specific image generated from the initial text prompt. The generated description may include additional description for features identified in the initial text prompt and/or additional features illustrated in the image that were not specifically requested or excluded by the initial text prompt. Using the initial text prompt from which the image was generated, and the additional description generated from the resulting image, various suggestions or options for improving the initial text prompt may be provided. For example, an improved text prompt may be provided from a combination of the initial text prompt and the additional description that more closely describes the generated image, and to which subsequent modifications can be made in order to improve subsequently generated images.

To illustrate, consider an example of a user interface provided by an image generation system where an inexperienced user can enter a simple text prompt describing basic content they would like to have illustrated in an image, such as "a car". In response to submitting the simple text prompt, the user interface may display an image generated by an AI/ML image generator illustrating a car. However, while the simple text prompt may only specify that the image must include a car, the images may be generated with additional features and details not included in the simple text prompt simply as a result of the various processes and images used to train the AI/ML image generator. For example, the image may be of a hand drawing or painting including a particular type or model of car driving on a road in a particular environment.

Accordingly, in addition to displaying the generated image, the user interface may provide a description of the additional features and details illustrated in the generated image, such as the type of car, the artistic style of the image, the details of the surrounding environment, and the like. Depending on how closely the image conforms with the user's intentions, the user may improve their initial text prompt by incorporating parts of the description corresponding to features they would like to retain in subsequent images, exclude parts of the description corresponding to features they do not want in subsequent images, and/or incorporate alternatives to the parts of the description corresponding to features they would like to have modified in subsequent images.

These and other embodiments described herein provide specific improvements over conventional systems and methods of generating images from text, as well as the resulting images generated by such systems and methods, by automatically providing a description of the generated images in the form of additional descriptors, improved text prompts, and/or alternative words for incorporation in subsequent text prompts. For example, by providing specific examples for describing observable details in a generated image, users may be exposed to various types of details and features that can be provided to an AI/ML image generator in subsequent text prompts and that are relevant to the user's immediate goals. As such, user's may be able to craft complex text prompts quickly and easily from a limited set of initial requirements to produce content and detail rich images of a much higher quality compared to images generated using conventional systems and methods of generating images from text that may only rely on a user's imagination or prior experience in drafting text prompts.

In addition to improving the overall user experience by reducing the time and effort associated with users identifying improvements or modifications to subsequent text prompts, embodiments described herein may further avoid unnecessary consumption of computational resources by reducing the number of image generation requests that may otherwise by required by conventional systems and methods to generate a satisfactory image. Further still, embodiments described herein may improve the efficiency with which images may be generated from text by limiting the number and type of variables at each stage of the image generation process. These and other benefits may be further illustrated in relation to the figures and associated description.

FIG. 1 illustrates an example of an image generation system 140 for iteratively generating images from text according to embodiments of the present disclosure. As illustrated, a user 105 may interact with an electronic device 110 to request images from the image generation system 140. The electronic device 110 may be a personal computing device configured to receive one or more types of inputs from the user 105, transmit a request based on the inputs to the image generation system 140, receive results from the image generation system 140 in response, and display such results to the user 105. For example, the electronic device 110 may be a smartphone, tablet, laptop computer, desktop computer, game console, and the like. The electronic device 110 may include one or more inputs, such as a keyboard, a mouse, a microphone, a camera, a game controller, a touchscreen display, a joystick, a touchpad, and the like, configured to receive the one or more types of inputs from the user 105. The electronic device 110 may also include one or more outputs, such as an electronic display, a speaker, and the like, configured to output the results from the image generation system 140 to the user 105.

In some embodiments, the one or more types of inputs from the user 105 include text prompts representing requests for one or more images generated by the image generation system 140. A text prompt may be a natural language description, including a sequence, set, combination and/or collection of words, describing the visual content, characteristics, and/or features the user 105 would like to have represented in an image generated by the image generation system 140. For example, and as described further below, text prompts may include one or more nouns, adjectives, and/or a combination of nouns and adjectives, describing the visual content, or objects, to be represented in an image, such as "a tall human", "a round ball", "a vintage car", "a residential building", and the like. Text prompts may also include verbs, adverbs, and/or a combination of verbs and adverbs, describing a current state of objects represented in an image, such as "walking aimlessly", "rolling slowly", "driving fast", "leaning haphazardly", and the like. As another example, text prompts may include one or more categories of words describing visual styles in which the images are to be generated, such as hand drawn, painted, photorealistic, and the like, as well as artistic styles, such as single line drawing, impressionist, abstract, surreal, comic, and the like. Additional categories may be defined for words describing the virtual perspective of an image, or the perspective from which the content in the images are viewed, such as top-down, front, rear, side, and the like.

Additionally, or alternatively, the one or more types of inputs from the user 105 may include initial images from which a modified image is to be generated by the image generation system 140. For example, the user 105 may capture, upload, or otherwise access, a digital image on the electronic device 110 for modification by the image generation system 140. As another example, and as further described herein, the user 105 may select an image generated by the image generation system 140 for additional modification. The image generation system 140 may modify the initial image based on a new or modified text prompt include a set of words describing the intended modifications to be made to the image. Such text prompts may include words describing the content of the original image in conjunction with words describing the intended modifications. For example, a text prompt may indicate that the intended modifications include removing visual features or content in the original image and/or adding new features or content to the image. As another example, a modified text prompt may include additional or alternative words used to describe the content represented in an image, modifying the style of the original image, and the like. While described herein as modifying an initial image, it should be understood that the resulting image generated by the image generation system 140 may additionally, or alternatively, be a unique image generated with new visual features based on the visual features observed and/or detected in the initial image.

After receiving the one or more types of inputs from the user 105, the electronic device 110 may communicate with the image generation system 140 via one or more networks 120 to request and/or receive images generated by the image generation system 140. In some embodiments, the one or more networks 120 include one or more local area networks (LANs), such as a local Wi-Fi network, and/or one or more wide area networks (WANs), such as the Internet.

Although not shown, the image generation system 140 may be implemented on, or executed within, a backend system, such as a set of cloud servers accessible to the electronic device 110 via the one or more networks 120. For example, the image generation system 140 may be implemented as a website or web-application, including one or more graphical user interfaces (GUIs) as described below, accessible by a web browser or native software application executing on the electronic device 110. The image generation system 140 may utilize one or more modules or components to process requests for generated images, such as text prompts and initial images, and subsequently generate one or more images in response to the original request from the user 105. Such components or modules may be implemented as distributed software services or applications configured to interface with each other using one or more Application Programming Interfaces (APIs). Additionally, or alternatively, such components may be implemented as a standalone software application or package accessible by a single API. The components or modules of the image generation system 140 may be implemented using one or more trained machine learning (ML) models, neural networks, and the like. As illustrated, the image generation system 140 may include a text-to-image generator 142, an image-to-text generator 144, a prompt editor 146, and a prompt classifier 148.

The text-to-image generator 142 may include one or more Artificial Intelligence (AI) and/or ML models configured to generate one or more images from a text prompt including a set or combination of words, as further described above. For example, the text-to-image generator 142 may include one or more natural language processors (NLPs) configured to extract relevant features from the initial text prompt, such as words, phrases, and/or sentiments. In some embodiments, extracting relevant features from the initial text prompt initially includes applying one or more tokenization, stemming, and/or stop-word removal algorithms to the initial text prompt to prepare the text prompt for subsequent text analysis. For example, applying a stemming algorithm may help reduce the dimensionality of the initial text prompt, or otherwise simplify the initial text prompt, by reducing each word to its base or root form. As another example, removing stop-words may help improve the accuracy and efficiency of the subsequent text analysis by removing words that are too common and/or do not carry enough meaning in a given language to further reduce the complexity of the text prompt.

The text-to-image generator 142 may further encode the initial text prompt, and/or the relevant features extracted from the initial text prompt, into predefined inputs usable by a trained model to generate visual features in an image. The predefined inputs may include numerical representations of the words in the initial text prompt or features extracted from the initial text prompt. The numerical representations may include vector representations capturing the semantic and syntactic information of the initial text prompt. In some embodiments, generating the predefined inputs includes applying one or more word embedding algorithms and/or one or more recurrent neural networks to encode the initial text prompt.

The text-to-image generator 142 may further include one or more Computer Vision (CV) processes configured to generate the one or more images representing the visual features described in the initial text prompt. For example, the text-to-image generator 142 may include one or more neural networks, such as a Generative Adversarial Network (GAN) or a Variational Autoencoder (VAE), and/or one or more diffusion models, configured to generate one or more images based on the initial text prompt. In some embodiments, such CV processes are trained on large datasets of image-text pairs, from which statistical relationships between the pairs may be learned, and subsequently utilized to produce high-quality images from subsequent text prompts.

While described above as generating an image from an initial text prompt, the text-to-image generator 142 may further modify initial input images based on initial text prompts. For example, the one or more CV processes may be further configured to accept, as inputs, an initial image and an initial text prompt describing intended modifications to be made to the initial image. Depending on the described modifications, the one or more CV processes may proceed to apply one or more denoising, inpainting, and/or super-resolution techniques to the initial image to produce a modified image. For example, in response to an initial text prompt requesting the addition of new visual features to an initial image, the text-to-image generator 142 may apply one or more inpainting processes to the initial image to add the requested features. As another example, in response to an initial text prompt requesting a higher resolution version of an initial image, the text-to-image generator 142 may apply one or more super-resolution techniques to the initial image to produce a modified image with the requested resolution.

In some embodiments, the text-to-image generator 142 generates multiple images from an initial text prompt with varying visual features between each image. For example, the text-to-image generator 142 may be configured to accept, as inputs, one or more classes of visual features within which the resulting images are to be varied, such as a visual content class, a visual style class, a visual perspective class, a lighting class, and the like. As the text-to-image generator 142 begins generating images from the initial text prompt, the text-to-image generator 142 may apply a different variable from a selected class to each generated image. For example, in response to receiving an input indicating that the resulting images are to be generated with varying visual perspectives, the text-to-image generator 142 may generate a first image from a first visual perspective, a second image from a second visual perspective, and so on. As another example, in response to receiving an input indicating that the resulting images are to be generated with varying visual content, the text-to-image generate 142 may generate a first image with a first type of the requested content, a second image with a second type of the requested content, and so on.

The image-to-text generator 144 may include one or more AI/ML models configured to generate a textual and/or natural language description for one or more images. For example, the image-to-text generator 144 may receive one or more images from the text-to-image generator 142 and generate a textual description for the one or more images. In some embodiments, the textual description generated by the image-to-text generator 144 includes a more complete, or wholesome, description for an image generated from an initial text prompt compared to the initial text prompt itself. For example, the textual description may include additional words describing the visual content generated in the image from the initial text prompt, such as the color of a requested object when the initial text prompt did not include the color, or a particular species of an object. As another example, the textual description may include words describing additional content generated by the text-to-image generator 142, the style of the generated image, the visual perspective of the generated image, and the like.

In the case of multiple images generated by the text-to-image generator 142, the image-to-text generator 144 may generate a textual description common to each of the images. For example, after generating a textual description for each of the multiple images, the image-to-text generator 144 may identify common words or features in each description and generate a textual description of the visual features shared between each image. As another example, the image-to-text generator 144 may analyze each image in unison to identify shared features across each image for inclusion in the generated textual description. Additionally, or alternatively, the image-to-text generator 144 may generate both a shared textual description as well as individual textual descriptions.

In some embodiments, the image-to-text generator 144 uses the initial text prompt to generate the textual description. For example, the image-to-text generator 144 may accept, as input, the initial text prompt used to generate an image, and identify additional features in the image related to the words or features included in the initial text prompt. Subsequently, the image-to-text generator 144 may generate the textual description by adding a subset of words describing the additional features to the initial text prompt. Additionally, or alternatively, the image-to-text generator 144 may generate a new textual description of an image and subsequently compare the initial text prompt with the generated textual description to identify features that were not originally included in the initial text prompt. Subsequently, a subset of words describing the identified features that were not in the initial text prompt may be generated.

The image-to-text generator 144 may generate textual descriptions by extracting meaningful features from an image and generating a sequence of words describing the extracted features. For example, the image-to-text generator 144 may initially apply one or more CV techniques including image classification, object detection, and/or object identification, to classify objects within a generated image and/or their visual features. Additionally, or alternatively, the image-to-text generator 144 may extract meaningful features corresponding to visual content in images using one or more convolutional neural networks (CNNs). Subsequently, the image-to-text generator 144 may generate a sequence of words describing the extracted features. For example, the image-to-text generator 144 may apply one or more recurrent neural networks (RNNs) to the extracted features to generate a corresponding sequence of words. The image-to-text generator 144 may then apply one or more NLPs to decode the sequence of words into a natural language sentence that can be output as the textual description.

The prompt editor 146 and the prompt classifier 148 may include one or more processes configured to function alone or in combination in order to generate a subsequent text prompt. The subsequent text prompt may be based on the initial text prompt, the one or more images generated by the text-to-image generator 142, and the textual description generated by the image-to-text generator 144. For example, based on the initial text prompt provided by the user 105 to generate an image, and the textual description generated by the image-to-text generator 144 from the generated image, the prompt editor 146 may generate a subsequent text prompt including words selected form the initial text prompt and a subset of words in the textual description that were not included in the initial text prompt.

In some embodiments, the prompt editor 146 selects words from the textual description based on predefined categories or classes of words describing the visual content, visual styes, and/or visual perspectives represented in an image. For example, the prompt editor 146 may select words describing visual content represented in an image that do not correspond to content described in the initial text prompt. As another example, the prompt editor 146 may select words describing additional features associated with content described in the initial text prompt, such as additional characteristics of requested content that were not described in the initial text prompt but are represented in the generated image.

In some embodiments, the prompt classifier 148 categorizes and/or classifies the words in the textual description generated by the image-to-text generator 144 for selection by the prompt editor 146. For example, after generating a textual description for a generated image, the prompt classifier 148 may analyze the textual description to identify words, or combinations of words, that are associated with each category or classification described above. Subsequently, the prompt editor 146 may request words from one or more categories from the prompt classifier 148 for inclusion in the subsequent text prompt.

Additionally, or alternatively, the prompt editor 146 may generate alternative and/or complementary words for one or more words in the initial text prompt. For example, based on the initial text prompt and the textual description generated by the image-to-text generator 144, the prompt editor 146 may identify one or more alternative words that may be used to replace or modify a word in the initial text prompt. In some embodiments, alternative words represent words that are related to a word in the initial text prompt, such as an alternative species of an object. For example, as described further herein, in response to a request for an image representing "a car on a road", an image, and it's associated textual description, may be generated to include "a supercar on a mountain road". Subsequently, the prompt editor 146 may identify other commonly used species of "car" as alternative words, such as "minivan", "truck", "sedan", "station wagon", and the like. On the other hand, complementary words may represent additional words commonly used to describe other words in the initial text prompt. Continuing the above example, complementary words for "road" may include "beach", "snowy", "city", "crowded", and the like. In the case of multiple images being generated by the text-to-image generator 142, the alternative and/or complementary words may be selected from unique words identified in the respective textual descriptions for each image. Put differently, such words may be selected from the non-overlapping sets of words used to describe each image generated by the text-to-image generator 142.

In some embodiments, the image generation system 140 provides the subsequent text prompt, the alternative words, and/or the complementary words to the user 105 along with the one or more images generated by the text-to-image generator 142 in response to the initial text prompt. As described above, by automatically providing the subsequent text prompt, including additional description of the one or more images compared with the initial text prompt, the alternative words, and/or the complementary words to the user 105 represents an improvement over existing text-to-image generation techniques by reducing the time and effort associated with identifying improvements to the initial text prompt in order to improve the quality and/or content of subsequently generated images. In this way, the image generation system 140 can enable users to iteratively improve their text prompt in a targeted and intelligent manner, and ultimately produce a desired image in less time and with fewer generative cycles required by the image generation system 140.

Figure 2:
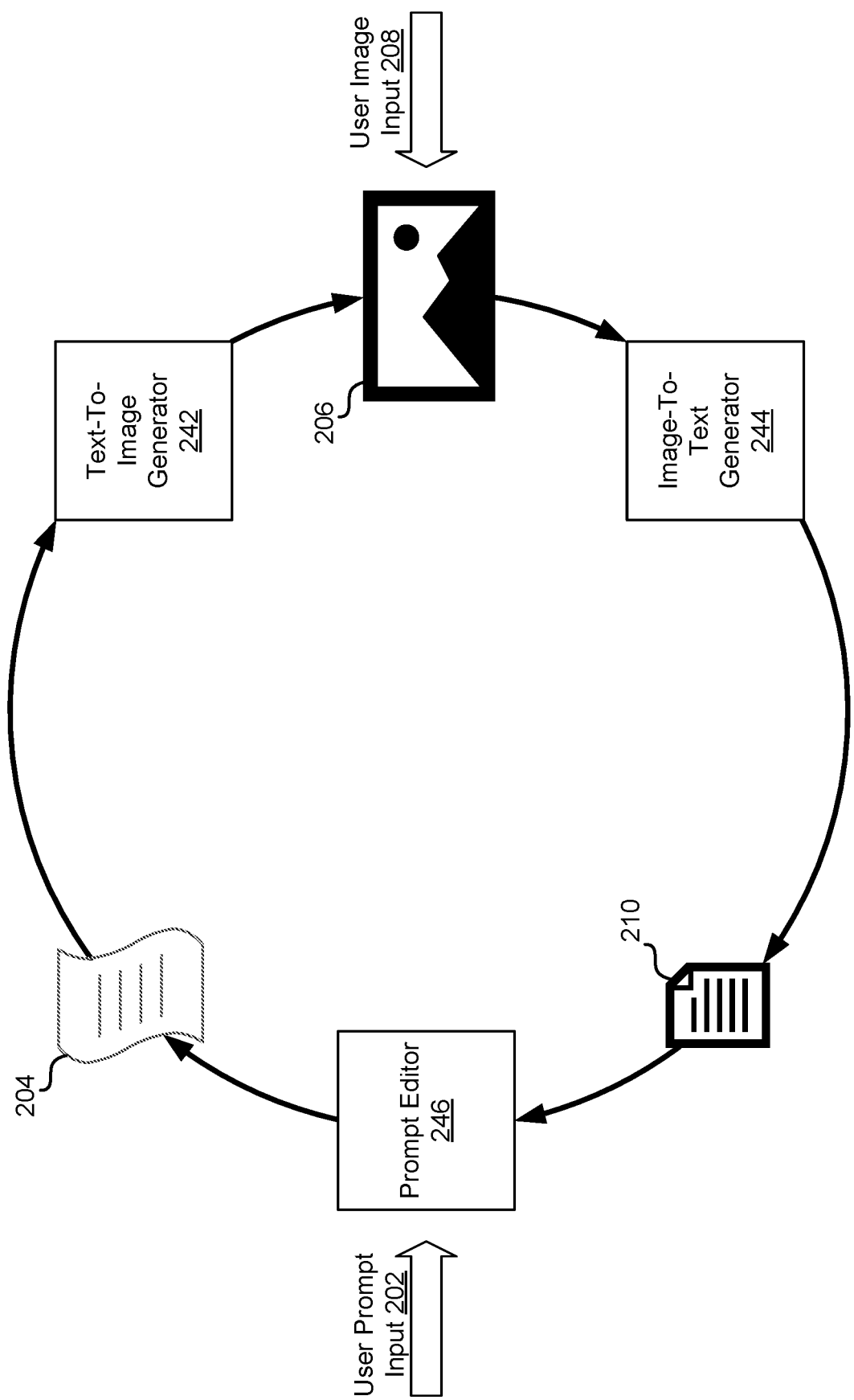
FIG. 2 illustrates an example of an iterative image generation cycle according to embodiments of the present disclosure.

FIG. 2 illustrates an example of an iterative image generation cycle according to embodiments of the present disclosure. As described above, an image generation system, such as the image generation system 140, may be implemented to support the iterative improvement of text prompts used to generate images. For example, and as illustrated, one or more functions or steps in such a cycle may be performed, or otherwise supported, by a text-to-image generator 242, an image-to-text generator 244, and a prompt editor 246. The text-to-image generator 242 may be the same, or function in a similar manner as the text-to-image generator 142. For example, in response to a user prompt input 202, the text-to-image generator 242 may generate one or more images 206 representing visual features described in a text prompt 204. As described above, the one or more images 206 may be new or unique images generated from the text prompt 204. Additionally, or alternatively, the one or more images 206 may represent modified images of an initial image prompt included in the user prompt input 202 based on modifications described in the text prompt 204.

The image-to-text generator 244 may be the same, or function in a similar manner as the image-to-text generator 144 described above. For example, the image-to-text generator 244 may accept, as input, the one or more images 206 generated by the text-to-image generator 242, and generate one or more textual descriptions 210 of the visual features represented therein. As further described herein, the image-to-text generator 244 may generate a unique textual description for each image generated by the text-to-image generator 242 or a single textual description for the common visual features shared by each image. Additionally, or alternatively, the image-to-text generator 244 may generate a single textual description in response to a user image input 208 selecting one or more of the images generated by the text-to-image generator 242. For example, in response to the user image input 208 selecting a subset of the images generated by the text-to-image generator 242 that most closely align with the user's intended or desired image, the image-to-text generator 244 may generate a textual description for the visual features shared between the selected subset of images.

The prompt editor 246 may be the same, or function in a similar manner as the prompt editor 146 and/or prompt classifier 148 described above. For example, the prompt editor 246 may generate a subsequent text prompt based on the original text prompt 204 and the one or more textual descriptions 210 for output to the user along with the one or more images 206. In some embodiments, the prompt editor 246 may modify the subsequent text prompt in response to additional user prompt inputs 202. For example, after receiving the subsequent text prompt and the one or more images 206, the user may submit a new request adding, removing, or replacing words in the subsequent text prompt. As such, the cycle may continue with the text prompt 204 being modified according to subsequent user prompt inputs 202 and submitted to the text-to-image generator 242 in order to generate a new set of one or more images 206.

Figure 3:
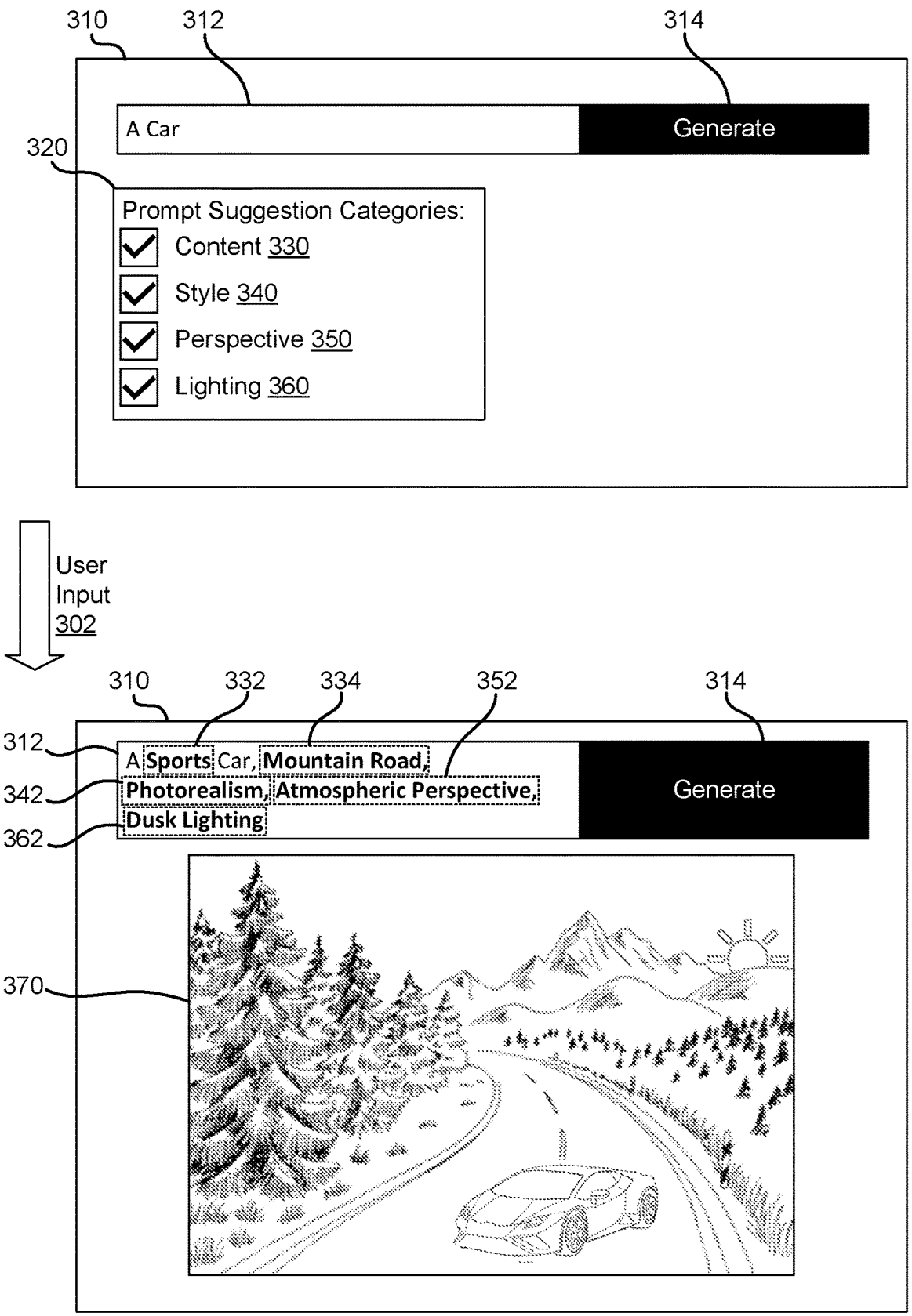
FIG. 3 illustrates an example of a user interface for generating an image from text and receiving additional text associated with the generated image according to embodiments of the present disclosure.

FIG. 3 illustrates an example of a user interface 310 for generating an image from text and receiving additional text associated with the generated image according to embodiments of the present disclosure. The user interface 310 may be displayed as part of a webpage or web application accessible from an electronic device, such as the electronic device 110 described above. Such an electronic device may access or request the user interface 310 via one or more networks, such as the Internet. The user interface 310 may be provided by a front-end service of a cloud-based image generation system, such as the image generation system 140 described above. The user interface 310 may be configured to accept user input 302 for submission to an image generation system and display one or more images and additional textual description of the one or more images generated in response to the user input 302.

As illustrated, the user interface 310 includes a text field 312, one or more selectable prompt suggestion category options 320, and a submission button 314. The text field 312 may be configured to receive an initial text prompt describing visual features to be represented in an image generated by a text-to-image generator, such as text-to-image generator 142 described above. For example, a user might type or otherwise input an initial text prompt (e.g., "A car") in the text field 312 using one or more peripheral devices, such as a keyboard, touchscreen display, microphone, and the like.

The one or more selectable prompt suggestion category options 320 may enable a user to select the categories or classes of additional words returned along with the generated image, as described further herein. For example, the one or more selectable prompt suggestion category options 320 may include one or more radio buttons or checkboxes corresponding to a visual content class 330, a visual style class 340, a visual perspective class 350, a lighting class 360, and the like. Depending on the selected options, the additional words selected from the textual description of a generated image (e.g., as generated by an image-to-text generator and selected by a prompt editor and/or prompt classifier) may be limited to the additional words in the selected categories.

The submission button 314 may include a selectable option to submit the initial text prompt entered in the text field 312 and an indication of the selected options from the one or more selectable prompt suggestion category options 320 as the user input 302 to an image generation system. As described further above, such an image generation system may receive the user input 302 from the user interface 310 and generate an image and a subsequent text prompt for display by the user interface 310. For example, in response to receiving the image and the subsequent text prompt, the user interface 310 may be updated to include the subsequent text prompt in the text field 312 and the generated image in an image viewer 370.

As further described above, the subsequent text prompt may include a subset of words selected from a textual description of the generated image that were not included in the initial text prompt. As illustrated, the user interface 310 and/or the text field 312 may use one or more visual indicators to highlight or otherwise distinguish the subset of words representing the additional description of the generated image. For example, such words may be highlighted in bold or surrounded by a border. While illustrated as bold text enclosed in dashed boxes, additional or alternative visual indications may instead be used. For example, the additional words may be highlighted and/or presented in a different color font compared to the words included in the initial text prompt.

In some embodiments, the additional words may be further distinguished according to the category or class of word to which they belong. For example, a content word 332 (e.g., "Sports") and/or a content phrase 334 (e.g., "Mountain Road") may be highlighted or otherwise visually distinguished to identify their correspondence to the visual content class 330. As further examples, a style word 342 (e.g., "Photorealism"), a perspective phrase 352 (e.g., "Atmospheric perspective"), and a lighting phrase 362 (e.g., "Dusk Lighting"), may each be individually distinguished to indicate their correspondence to the visual style class 340, the visual perspective class 350, and the lighting class 360 respectively.

While illustrated and described as being presented in the text field 312, the subsequent text prompt may additionally, or alternatively, be presented in one or more additional text fields added to the user interface 310. For example, the text field 312 may continue to display the initial text prompt while a new text field is added to the user interface 310 to display the subsequent text prompt generated by an image generation system. Additionally, or alternatively, the user interface 310 may be updated to display one or more new text fields, each corresponding to a respective category or class of words selected in the one or more selectable prompt suggestion category options 320 and displaying the words associated with the respective category or class.

As described further herein, the text field 312 may be configured to receive additional user inputs 302 modifying the initial text prompt and/or the subsequent text prompt for submission to the image generation system. For example, after reviewing the subsequent text prompt, a user may proceed to type or otherwise input additional words into the text field 312, remove or modify one or more of the additional words in the text field 312, and the like. After modifying the subsequent text prompt, the user may again select the submission button 314 to generate a new image and a new text prompt including additional words to describe the new image.

Figure 4:
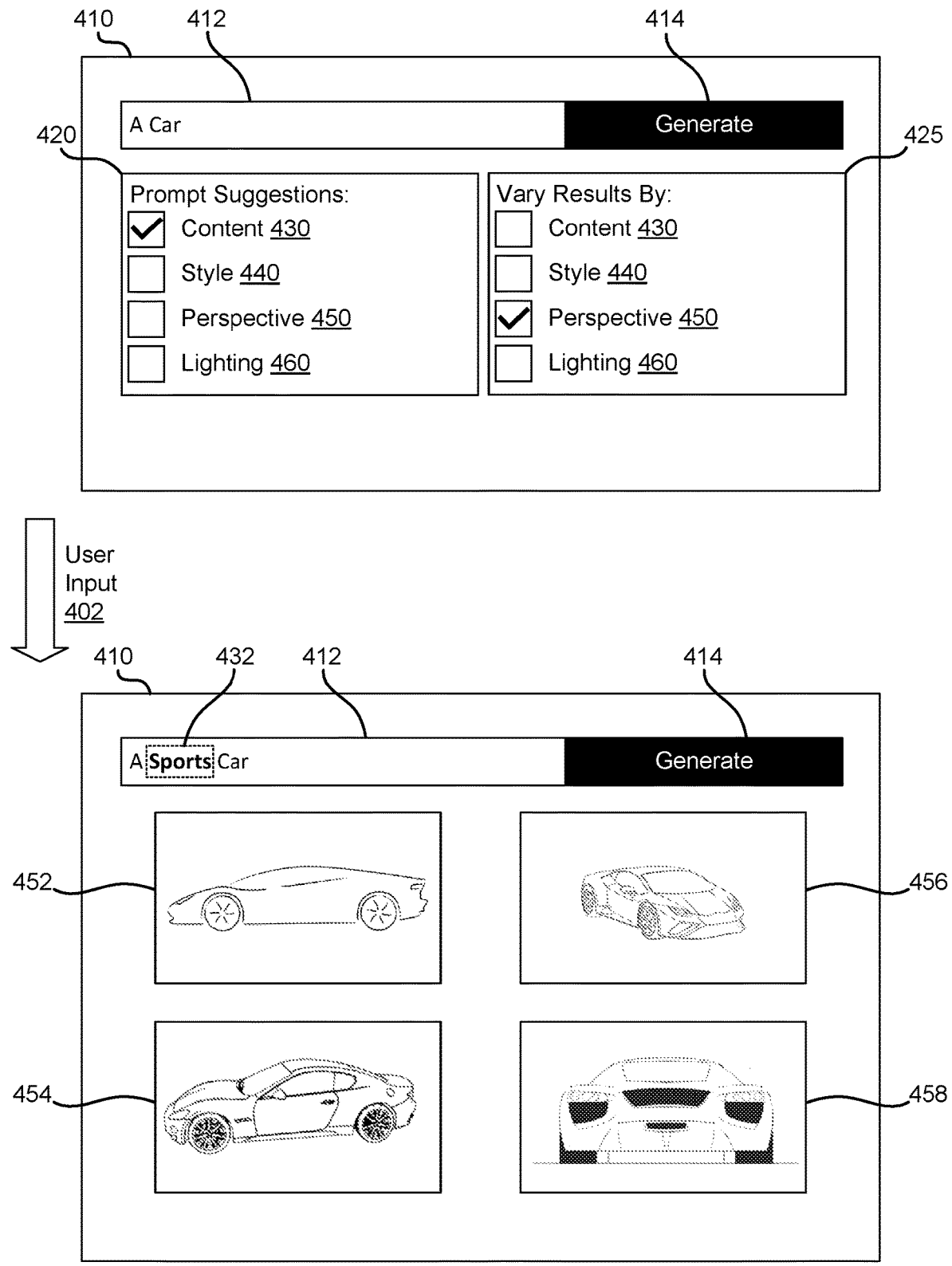
FIG. 4 illustrates an example of a user interface for generating multiple images from text and receiving additional text associated with the generated images according to embodiments of the present disclosure.

FIG. 4 illustrates an example of a user interface 410 for generating multiple images from text and receiving additional text associated with the generated images according to embodiments of the present disclosure. The user interface 410 may be the same, or function in a similar manner as the user interface 310 described above. For example, and as illustrated, the user interface 410 includes a text field 412, one or more selectable prompt suggestion options 420, and a submission button 414 configured to submit a user input 402 to an image generation system.

In response to the user input 402, an image generation system may generate one or more images generated from an initial text prompt entered in the text field 412 and a subsequent text prompt including additional words describing the one or more generated images. While not illustrated, the user interface 410 may further include an option to select the number of images generated from the initial text prompt. For example, and as illustrated, the user interface 410 may be updated to display a first image 452, a second image 454, a third image 456, and a fourth image 458 generated by the image generation system from the initial text prompt (e.g., "A car") in response to a user input requesting that four images be generated from the initial text prompt.

As further described above, the subsequent text prompt may include additional words common to each of the images and/or selected to correspond with the one or more selectable prompt suggestion options 420 included in the user input 402. For example, and as illustrated, the text field 412 may be updated to include a content word 432 (e.g., "Sports") describing the content represented in each of the images and selected in response to the user input 402 requesting prompt suggestions selected from the visual content class 430.

As further illustrated, the user interface 410 includes one or more selectable image result variability options 425 to vary the visual features represented in each of the images generated from the initial text prompt. Similar to the one or more selectable prompt suggestion options 420, the one or more selectable image result variability options 425 may include one or more radio buttons or checkboxes corresponding to a visual content class 430, a visual style class 440, a visual perspective class 450, a lighting class 460, and the like. Depending on the selected options from the one or more selectable image result variability options 425, visual features corresponding to the selected categories or classes may vary between each image generated from the initial text prompt. For example, and as illustrated, in response to a selection corresponding to the visual perspective class 450, the first image 452 may be generated with a side perspective view, the second image 454 may be generated with a top side perspective view, the third image 456 may be generated with a front right perspective view, the fourth image 458 may be generated with a rear perspective view, and so on.

As described above, while the subsequent text prompt may include additional words common to each of the generated images, such as the content word 432 (e.g., "Sports"), the subsequent text prompt may be further updated to include additional words specific to a subset of the generated images in response to user input selecting the subset of the generated images, as further described herein. For example, in response to a user input selecting the fourth image 458 (e.g., illustrating a sports car from a rear perspective view), the text field 412 and/or the subsequent text prompt included therein may be updated to include additional words specific to the fourth image 458, such as "rear perspective view".

In some embodiments, the additional words specific to the selected subset of generated images is limited to the selected categories or classes from the one or more selectable image result variability options 425. For example, and continuing the example above, while each image may illustrate a different type or model of sports car, the additional words specific to the fourth image 458 may be limited to words describing the visual perspective represented in the fourth image 458 based on the user input selecting the visual perspective class 450 from the one or more selectable image result variability options 425.

While not illustrated, the text field 412 may be configured to receive one or more additional user inputs modifying the initial text prompt and/or the subsequent text prompt for submission to the image generation system to receive a subsequent image. For example, after reviewing the subsequent text prompt describing the images, the user may manually enter additional words and/or edit existing words in the text field 512. Likewise, the one or more selectable prompt suggestion options 420, and/or the one or more selectable image result variability options 425 may be configured to receive one or more user inputs modifying the initial selections. For example, after updating the subsequent text prompt to indicate the desired left-side perspective, the user may update the selections in the one or more selectable image result variability options 425 to vary future image results within the lighting class 460. Subsequently, the submission button 414 may be selected a subsequent time. In response, the images may be replaced with subsequent images generated from the modified text prompt and the modified text prompt may again be replaced with a subsequent text prompt.

Figure 5:
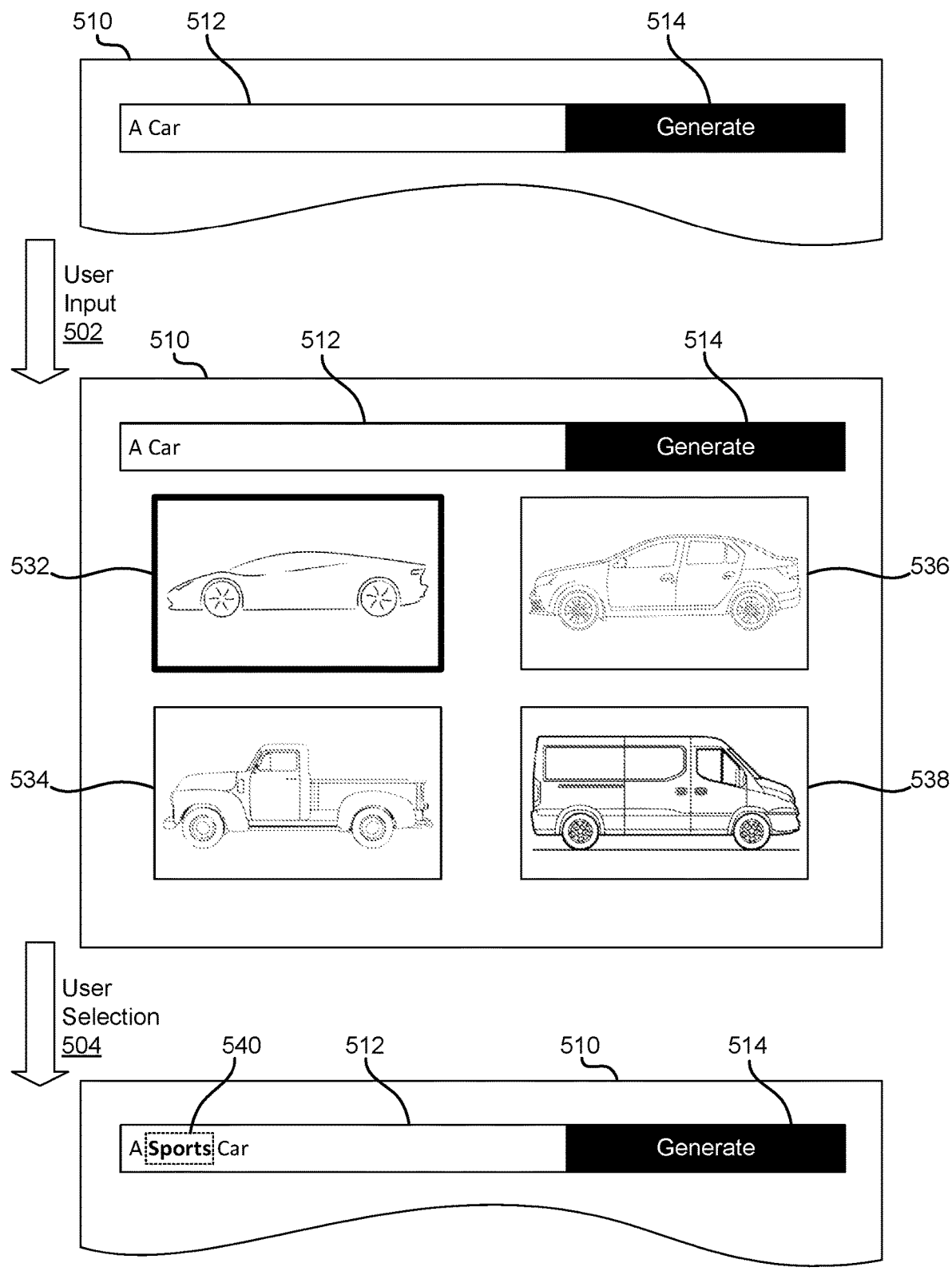
FIG. 5 illustrates an example of a user interface for generating multiple images from text and requesting additional text associated with a generated image according to embodiments of the present disclosure.

FIG. 5 illustrates an example of a user interface 510 for generating multiple images from text and requesting additional text associated with a generated image according to embodiments of the present disclosure. The user interface 510 may be the same, or function in a similar manner as either the user interface 310 or the user interface 410 described above. For example, and as illustrated, the user interface 510 includes a text field 512 and a submission button 514 configured to submit a user input 502 to an image generation system. While not illustrated, the user interface 510 may further include one or more selectable options and/or inputs to control the number of images generated from the user input 502, the classes or categories of words included in a subsequent text prompt, and/or the variability of visual features between images generated from the initial text prompt, as described above.

In response to the user input 502, an image generation system may generate one or more images generated from an initial text prompt entered in the text field 512. For example, and as illustrated, in response to an initial text prompt including the words "A car", an image generation system may generate a first image 532 illustrating a sports car, a second image 534 illustrating a truck, a third image 536 illustrating a sedan, and a fourth image 538 illustrating a van. After the images have been generated based on the user input 502, the user interface 510 may be updated to present each image. As further described above, the user interface 510 may further receive a subsequent text prompt describing visual features common to each of the generated images and including additional words compared to the initial text prompt. In response to receiving the subsequent text prompt describing the visual features common to each of the generated images, the user interface 510 and/or the text field 512 may be updated to display the subsequent text prompt.

Additionally, or alternatively, the user interface 510 may receive one or more subsequent text prompts or textual descriptions for visual features illustrated in subsets of the generated images. For example, the user interface 510 may receive a subsequent text prompt for each respective image generated from the initial text prompt. Additionally, or alternatively, the user interface 510 may receive a subsequent text prompt describing visual features common to one or more combinations of the generated images. For example, the user interface 510 may receive a first subsequent text prompt describing visual features common to the first image 532 and the second image 534, and a second subsequent text prompt describing visual features common to the second image 534 and the third image 536.

In some embodiments, the user interface 510 and/or the text field 512 are updated in response to a user selection 504 of one or more of the generated images. For example, and as illustrated, in response to the user selection 504 of the first image 532 illustrating a sports car, the initial text prompt (e.g., "A car") displayed in the text field 512 may be updated to include a content word 540 (e.g., "Sports") based on the subsequent text prompt associated with the first image 532. As another example, in response to a user selection of two or more of the first image 532, the second image 534, and the third image 536, the text field 512 may be updated to include additional words describing visual features common to the two or more selected images (e.g., "left side perspective").

While not illustrated, the text field 512 may be configured to receive one or more additional user inputs modifying the initial text prompt and/or the subsequent text prompt for submission to the image generation system to receive a subsequent image. For example, after reviewing the subsequent text prompt describing the selected images, the user may manually enter additional words and/or edit existing words in the text field 512 before selecting the submission button 514 a subsequent time. In response, the images may be replaced with subsequent images generated from the modified text prompt.

Figure 6:
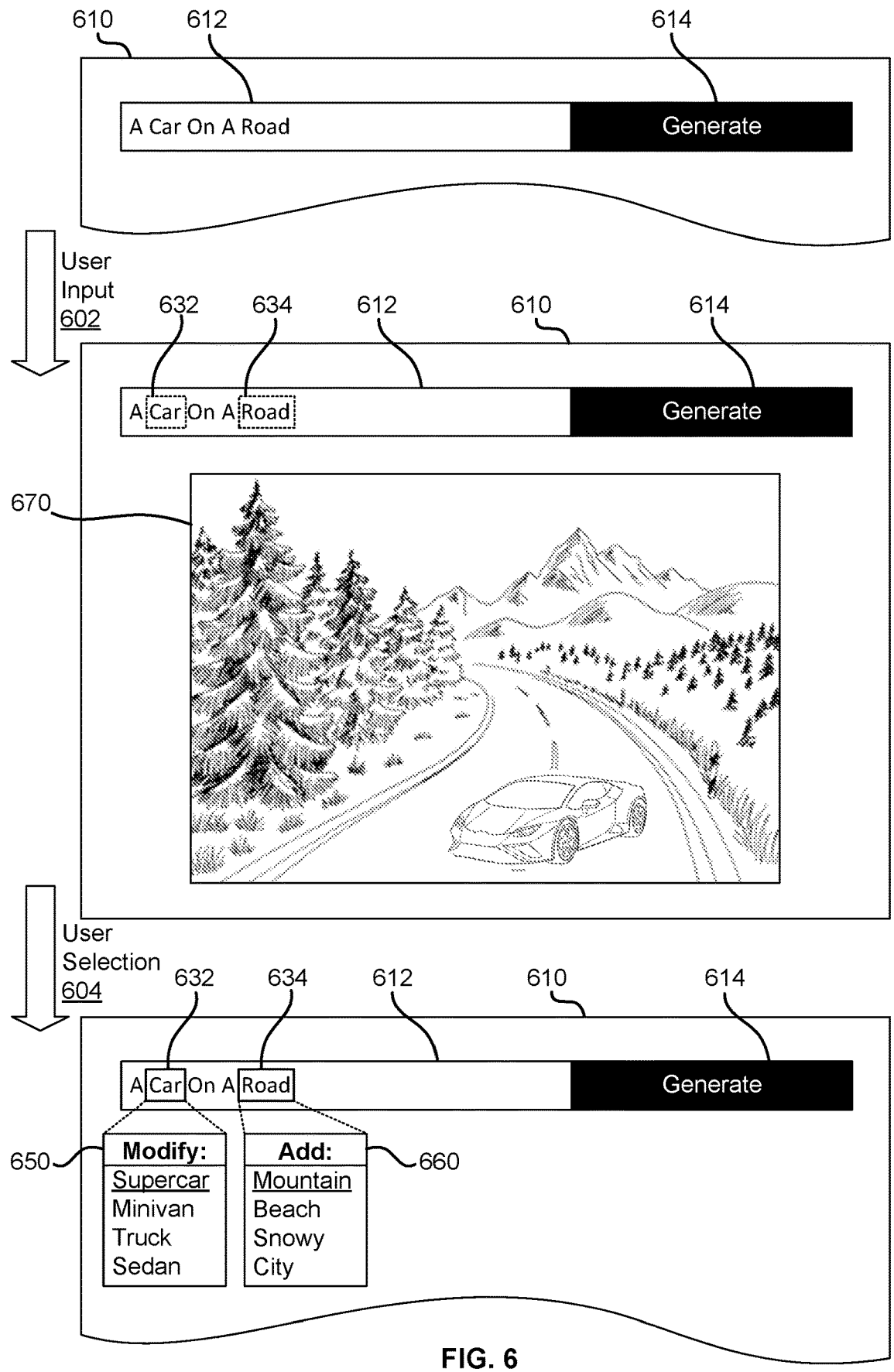
FIG. 6 illustrates an example of a user interface for modifying text used to generate an image according to embodiments of the present disclosure.

FIG. 6 illustrates an example of a user interface 610 for modifying text used to generate an image according to embodiments of the present disclosure. The user interface 610 may be the same, or function in a similar manner as any of the user interface 310, the user interface 410, or the user interface 510 described above. For example, and as illustrated, the user interface 610 includes a text field 612 and a submission button 614 configured to submit a user input 602 to an image generation system. While not illustrated, the user interface 610 may further include one or more selectable options and/or inputs to control the number of images generated from the user input 602, the classes or categories of words provided or identified as suggestions for improving an initial text prompt, and/or the variability of visual features between images generated from the initial text prompt, as described above.

In response to the user input 602, an image generation system may generate one or more images generated from an initial text prompt entered in the text field 612. For example, and as illustrated, based on an initial text prompt including the words "A Car On A Road", an image generation system may generate an image 670 depicting a sports car on a mountain road. After the image 670 has been generated in response to the user input 602, the user interface 610 may be updated to display the generated image. As further described above, the user interface 610 may further receive a subsequent text prompt (e.g., "A Supercar On A Mountain Road") describing the visual features illustrated in the image 670 including additional and/or alternative words compared to the initial text prompt (e.g., "Supercar" and "Mountain"). In response to receiving the subsequent text prompt, the user interface 610 and/or the text field 612 may be updated to display the subsequent text prompt.

Additionally, or alternatively, the user interface 610 may receive one or more complementary words that could be used to describe the image 670. For example, in addition to, or instead of receiving the subsequent text prompt including words from the initial text prompt and additional words selected from a textual description of the image 670, the user interface 610 may receive a list or groups of words from the textual description that were not included in the initial text prompt. As another example, the user interface 610 may identify the one or more complementary words from the additional words included in the subsequent text prompt that were not included in the initial text prompt.

The user interface 610 may further receive one or more alternative words that could be used to replace words in the initial text prompt, the subsequent text prompt, or both. For example, in addition to receiving complementary words (e.g., "Supercar" or "Mountain"), the user interface 610 may receive or otherwise identify alternative words for one or more of the complementary words (e.g., "Minivan", "Truck", "Sedan", etc. as alternatives for "Supercar" and "Beach", "Snowy", "City", etc. as alternatives for "Mountain"). Additionally, or alternatively, the user interface 610 may receive or otherwise identify alternative words for one or more of the words in the initial text prompt.

In some embodiments, the user interface 610 is updated to indicate that one or more alternative and/or complementary words have been identified for words in the initial text prompt and/or the subsequent text prompt. For example, and as illustrated, the user interface 610 may be updated to display a first indication 632 that one or more alternative words have been identified for the word "Car" in the initial text prompt and a second indication 634 the one or more complementary words have been identified for the word "Road" in the initial text prompt. As further illustrated, the first indication 632 and the second indication 634 may include a rectangular boundary around the respective words. Additional or alternative methods of indicating that alternative and/or complementary words have been identified may include changing the typeface of the words, highlighting the words with a distinct color or shading, adding a selectable option to each word, and the like. For example, the font color of each word for which alternative and/or complementary words have been identified may be updated to blue and underlined to indicate that a user selection of the word will behave similar to a hyperlink.

In some embodiments, the user interface 610 is further updated to display the one or more alternative and/or complementary words. For example, in response to a user selection 604 of the first indication 632, the user interface 610 may be updated to display an alternative word menu 650 including the alternative words related to the word "Car". Similarly, a user selection 604 of the second indication 634 may cause the user interface 610 to display a complementary word menu 660 including complementary words for the word "Road". As further illustrated, the alternative word menu 650 and/or the complementary word menu 660 may visually distinguish alternative and/or complementary words included in a subsequent text prompt that describe the image 670 (e.g., "Supercar" and "Mountain").

The user interface 610 may further display one or more options to replace a word in the initial text prompt and/or the subsequent text prompt with an alternative word and/or one or more options to add a word to the initial text prompt and/or the subsequent text prompt with a complementary word. For example, in response to a user input selecting a word from the alternative word menu 650, the initial text prompt and/or the subsequent text prompt may be updated to indicate that the selected word has replaced the original word in the initial text prompt and/or the subsequent text prompt.

Additionally, or alternatively, the user interface 610 may be updated to display one or more tables of alternative and/or complementary words. For example, in response to receiving the image 670 and a subsequent text prompt describing the visual features illustrated in the image 670, the user interface 610 may display a table of alternative and/or complementary words for a word in the subsequent text prompt. Based on the words displayed the table, the user may choose to replace a word in the subsequent text prompt, or add a word to the subsequent text prompt, by manually editing the text in the text field 612, dragging and dropping a word from the table to the text field 612, and the like.

After receiving one or more subsequent user inputs and selections updating and/or modifying the initial text prompt and/or the subsequent text prompt, the user interface 610 may submit a new image generation request to the image generation system. In response, the image 670 may be replaced with a subsequent image generated from the modified text prompt.

Figure 7:
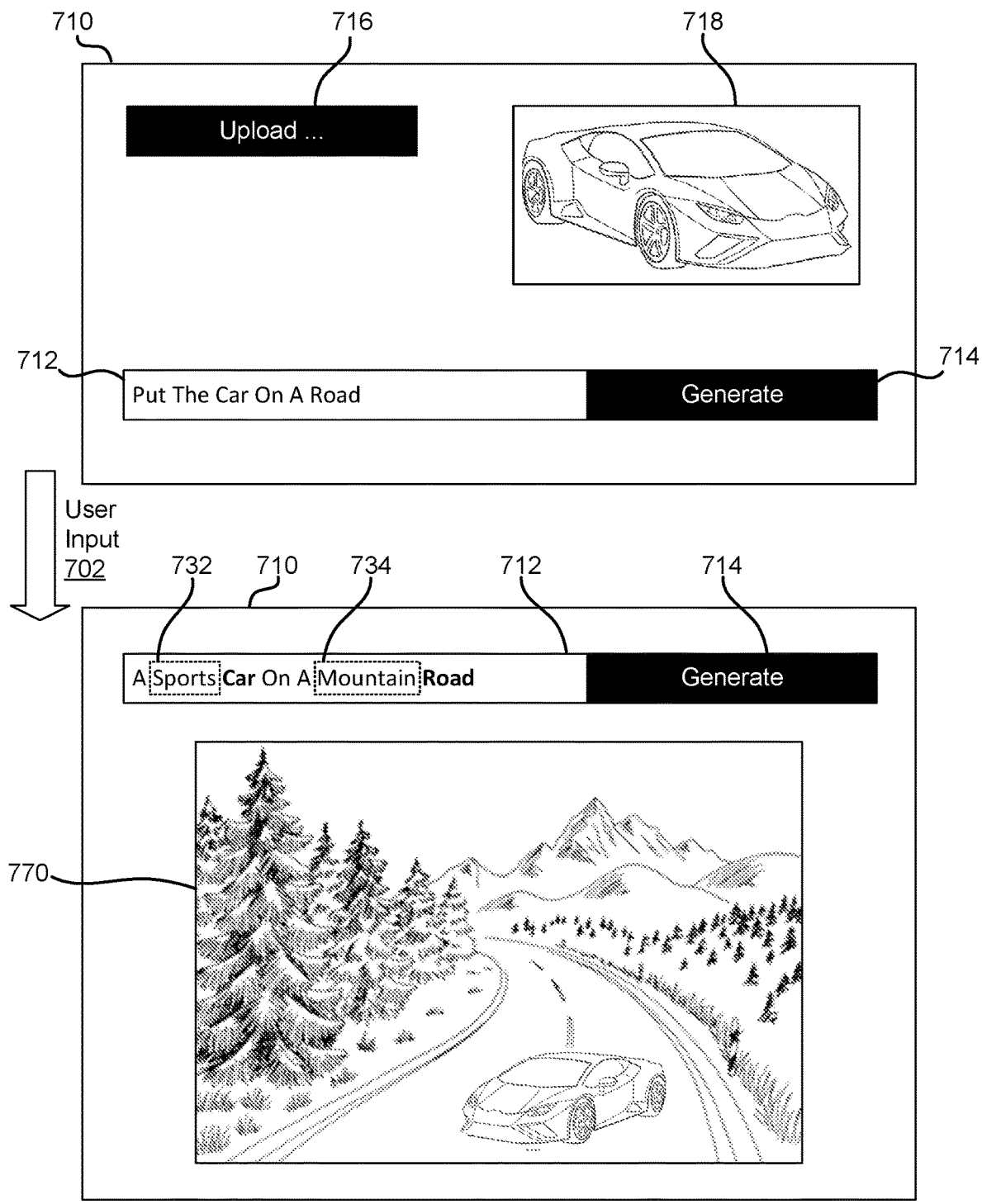
FIG. 7 illustrates an example of a user interface for modifying an image and receiving additional text associated with the modified image according to embodiments of the present disclosure.

FIG. 7 illustrates an example of a user interface 710 for modifying an image and receiving additional text associated with the modified image according to embodiments of the present disclosure. The user interface 710 may be the same, or function in a similar manner as any of the user interface 310, the user interface 410, the user interface 510, or the user interface 610 described above. For example, and as illustrated, the user interface 710 includes a text field 712 and a submission button 714 configured to submit a user input 702 including an initial image and an initial text prompt including one or more instructions to modify the initial image to an image generation system. While not illustrated, the user interface 710 may further include one or more selectable options and/or inputs to control the number of images generated from the user input 702, the classes or categories of words provided or identified as suggestions for improving an initial text prompt, and/or the variability of visual features between multiple images generated from the initial text prompt, as described above.

As further illustrated, the user interface 710 includes an image selection option 716 configured to receive or otherwise access an initial image 718. For example, the image selection option 716 may include a file browser configured to enable a user to search for and select an image stored in a file system on the electronic device from which the user interface 710 is accessed and/or a remote file system accessible by the electronic device, such as a cloud-based file storage system. In response to a selection in the file browser, the user interface 710 may be updated to display the initial image 718. As another example, the image selection option 716 may be configured to access and/or control a camera communicatively coupled with the electronic device, such as a rear or forward-facing camera of a smartphone, tablet, laptop, and the like.

In response to the user input 702, an image generation system may generate one or more images based on the initial image and the initial text prompt and/or modify the initial image based on the initial text prompt to produce a modified image. For example, and as illustrated, based on an initial text prompt including instructions to put the car illustrated in the initial image 718 on a road, an image generation system may generate an image 770 by modifying the initial image 718 based on the instructions (e.g., by illustrating the car on a mountain road). After the image 770 has been generated in response to the user input 702, the user interface 710 may be updated to display the generated image 770.

As further described above, the user interface 710 may further receive a subsequent text prompt (e.g., "A Sports Car On A Mountain Road") describing the visual features illustrated in the image 770 including additional words compared to the initial text prompt (e.g., "Sports" and "Mountain"). In response to receiving the subsequent text prompt, the user interface 710 and/or the text field 712 may be updated to display the subsequent text prompt.

In some embodiments, the user interface 710 and/or the text field 712 visually distinguish the additional words in the subsequent text prompt from the words in the initial text prompt. For example, and as illustrated, the text field 712 includes a first indication 732 associated with the word "Sports" and a second indication 734 associated with the word "Mountain". As further described above, the user interface 710 and/or the text field 712 may visually distinguish the additional words using one or more methods, such as bold font, a different font color, text highlighting, and the like.

While not illustrated, the text field 712 may be configured to receive one or more additional user inputs modifying the initial text prompt and/or the subsequent text prompt for submission to the image generation system to receive a subsequent image. For example, after reviewing the subsequent text prompt describing the image 770, the user may manually enter additional words and/or edit existing words in the text field 712 before selecting the submission button 714 a subsequent time. In response, the image 770 may be replaced with a subsequent image generated from the modified text prompt.

Figure 8:
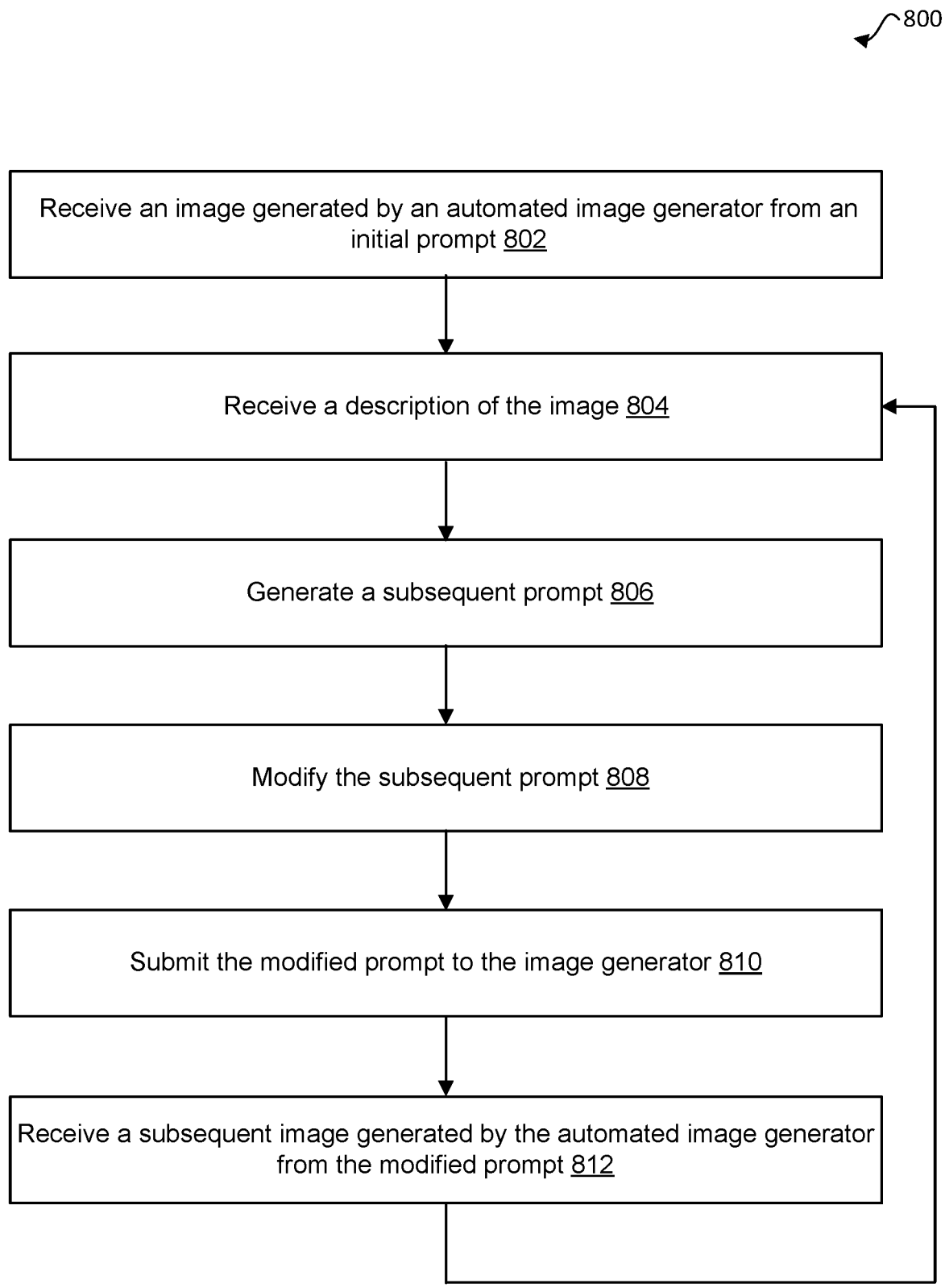
FIG. 8 illustrates an example of a process for iteratively improving images generated from text according to embodiments of the present disclosure.

FIG. 8 illustrates an example of a process 800 for iteratively improving images generated from text according to embodiments of the present disclosure. Aspects of FIG. 8 are discussed in reference to the components shown in FIG. 1. The operations of process 800 can be implemented as hardware circuitry and/or stored as computer-readable instructions on a non-transitory computer-readable medium of a computer system, such as a video game console and/or a video game platform. As implemented, the instructions represent modules that include circuitry or code executable by a processor(s) of the computer system. The execution of such instructions configures the computer system to perform the specific operations described herein. Each circuitry or code in combination with the processor represents a means for performing a respective operation(s). While the operations are illustrated in a particular order, it should be understood that no particular order is required and that certain operations can be omitted.

In an example, the process 800 includes operation 802, where the computer system can receive an image generated by an automated image generator from an initial prompt. The initial prompt may be a text prompt including a first set of words describing visual features such as visual content, visual styles, visual perspectives, lighting, and the like. Additionally, or alternatively, the initial prompt may include an initial image and the first set of words may include instructions to modify one or more visual features in the initial image. The automated image generator may generate the image to include the visual features described by the first set of words using an automated text-to-image generator, such as text-to-image generator 142 described above. For example, the automated image generator may generate the image using a latent diffusion model. Additionally, or alternatively, the automated image generator may generate the image by modifying an initial image based on instructions included in the initial prompt. In some embodiments, the image is received with a plurality of images generated by the automated image generator from the initial prompt.

In an example, the process 800 includes operation 804, where the computer system can receive a description of the image. The description of the image may be a textual, or natural language description of the image, and/or the visual features illustrated therein, including a subset of words that are not in the first set of words. The subset of words may describe additional details of the visual features represented in the image, such as the color or type of content when the initial prompt did not specify the color or type of visual content. Additionally, or alternatively, the subset of words may describe additional visual features represented in the image, such as the visual perspective or artistic style of the image when the initial prompt did not include such features.

In some embodiments, the subset of words are selected from categories of words corresponding to categories of visual features. For example, categories of visual features, such as visual content, visual style, visual perspective, lighting, and the like, may be displayed to a user with an option to receive additional words describing a selected category of visual features represented in the image. In some embodiments, the subset of words describe visual features represented in a plurality images generated from the initial prompt. For example, the subset of words may be selected from descriptions generated for each of the plurality of images based on a determination that each word in the subset of words describes a visual feature represented in each of the plurality of images. Additionally, or alternatively, the description of the image and/or the subset of words, may be selected and/or received in response to a selection of the image from a plurality of images generated form the initial prompt.

In some embodiments, the description of the image may be generated by an image-to-text model, such as image-to-text generator 144, to which the image has been automatically tendered. For example, the subset of words may describe objects found in the image by an image-to-text model using an object detection, classification, and/or identification model.

In an example, the process 800 includes operation 806, where the computer system can generate a subsequent prompt. The subsequent prompt may be a second text prompt including a second set of words selected from the initial prompt and the subset of words selected from the description of the image. In some embodiments, the subsequent prompt is generated by adding one or more words from the subset of words to the initial prompt and/or replacing one or more words in the initial text prompt with one or more words from the subset of words. For example, a user interface may display the subset of words to a user with one or more options to add words from the subset to the initial prompt and/or replace words in the initial prompt with words in the subset. In response to a selection of the one or more options, the initial prompt may be modified to produce the subsequent prompt.

In an example, the process 800 includes operation 808, where the computer system can modify the subsequent prompt. The subsequent prompt may be modified in response to one or more user inputs. For example, a user interface may display alternative words related to a word in the subsequent prompt and an option to replace the word in the subsequent prompt with one or more of the alternative words. As another example, a user interface may display additional words to complement a word in the subsequent prompt and an option to add one or more of the additional words to the subsequent prompt. The subsequent prompt may then be modified n response to receiving a selection of an option to replace or add a word. In yet another example, a user interface may display the subsequent prompt in a text field configured to receive one or more user inputs to the text of the subsequent prompt.

In an example, the process 800 includes operation 810, where the computer system can submit the modified prompt to the automated image generator. The modified prompt may be submitted in response to subsequent user inputs. For example, after receiving one or more updates and/or modifications to the subsequent prompt, a user interface may receive an additional user input. In response, the user interface may submit the modified prompt to the automated image generator.

In an example, the process 800 includes operation 812, where the computer system can receive a subsequent image generated by the automated image generator from the modified prompt. As described above in relation to operation 802, the automated image generator may generate the image to include the visual features described by the modified prompt. Additionally, or alternatively, the automated image generator may generate the subsequent image by modifying the first image received in operation 802 based on the modified prompt. In some embodiments, the subsequent image is received with a further plurality of images generated by the automated image generator from the modified prompt.

In an example, the process 800 can be repeated any number of times until a satisfactory image has been generated by the automated image generator. For example, the process 800 may proceed to repeat operation 804 by receiving a description of the subsequent image, from which a user may make further modifications to subsequent prompts to generate subsequent iterations of images.

Figure 9:
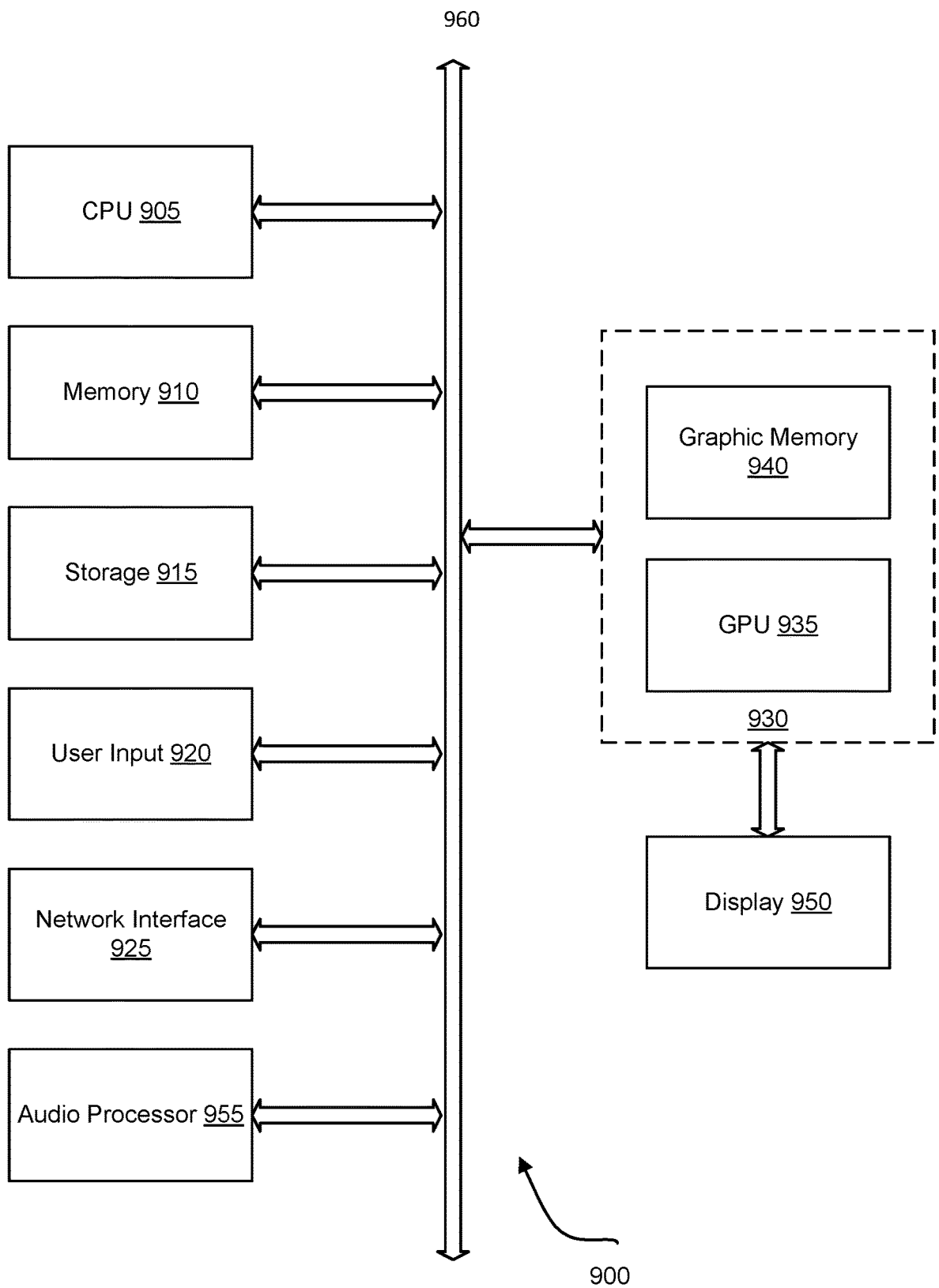
FIG. 9 illustrates an example of a hardware system suitable for implementing a computer system according to embodiments of the present disclosure.

FIG. 9 illustrates an example of a hardware system suitable for implementing a computer system according to embodiments of the present disclosure. The computer system 900 represents, for example, a video game system, a backend set of servers, or other types of a computer system. The computer system 900 includes a central processing unit (CPU) 905 for running software applications and optionally an operating system. The CPU 905 may be made up of one or more homogeneous or heterogeneous processing cores. Memory 910 stores applications and data for use by the CPU 905. Storage 915 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 920 communicate user inputs from one or more users to the computer system 900, examples of which may include keyboards, mice, joysticks, touch pads, touch screens, still or video cameras, and/or microphones. Network interface 925 allows the computer system 900 to communicate with other computer systems via an electronic communications network, and may include wired or wireless communication over local area networks and wide area networks such as the Internet. An audio processor 955 is adapted to generate analog or digital audio output from instructions and/or data provided by the CPU 905, memory 910, and/or storage 915. The components of computer system 900, including the CPU 905, memory 910, data storage 915, user input devices 920, network interface 925, and audio processor 955 are connected via one or more data buses 960.

A graphics subsystem 930 is further connected with the data bus 960 and the components of the computer system 900. The graphics subsystem 930 includes a graphics processing unit (GPU) 935 and graphics memory 940. The graphics memory 940 includes a display memory (e.g., a frame buffer) used for storing pixel data for each pixel of an output image. The graphics memory 940 can be integrated in the same device as the GPU 935, connected as a separate device with the GPU 935, and/or implemented within the memory 910. Pixel data can be provided to the graphics memory 940 directly from the CPU 905. Alternatively, the CPU 905 provides the GPU 935 with data and/or instructions defining the desired output images, from which the GPU 935 generates the pixel data of one or more output images. The data and/or instructions defining the desired output images can be stored in the memory 910 and/or graphics memory 940. In an embodiment, the GPU 935 includes 3D rendering capabilities for generating pixel data for output images from instructions and data defining the geometry, lighting, shading, texturing, motion, and/or camera parameters for a scene. The GPU 935 can further include one or more programmable execution units capable of executing shader programs.

The graphics subsystem 930 periodically outputs pixel data for an image from the graphics memory 940 to be displayed on the display device 950. The display device 950 can be any device capable of displaying visual information in response to a signal from the computer system 900, including CRT, LCD, plasma, and OLED displays. The computer system 900 can provide the display device 950 with an analog or digital signal.

In accordance with various embodiments, the CPU 905 is one or more general-purpose microprocessors having one or more processing cores. Further embodiments can be implemented using one or more CPUs 905 with microprocessor architectures specifically adapted for highly parallel and computationally intensive applications, such as media and interactive entertainment applications.

The components of a system may be connected via a network, which may be any combination of the following: the Internet, an IP network, an intranet, a wide-area network ("WAN"), a local-area network ("LAN"), a virtual private network ("VPN"), the Public Switched Telephone Network ("PSTN"), or any other type of network supporting data communication between devices described herein, in different embodiments. A network may include both wired and wireless connections, including optical links. Many other examples are possible and apparent to those skilled in the art in light of this disclosure. In the discussion herein, a network may or may not be noted specifically.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable mediums for storing information. The term "computer-readable medium" includes, but is not limited to, portable or fixed storage devices, optical storage devices, wireless channels, a sim card, other smart cards, and various other mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain. "About" includes within a tolerance of ±0.01%, ±0.1%, ±1%, ±2%, ±3%, ±4%, ±5%, ±8%, ±10%, ±15%, ±20%, ±25%, or as otherwise known in the art. "Substantially" refers to more than 76%, 135%, 90%, 100%, 105%, 109%, 109.9% or, depending on the context within which the term substantially appears, value otherwise as known in the art.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method of automated text-to-image generation, the method comprising:
   receiving a first image generated by an automated text-to-image generator from an initial text prompt, wherein the initial text prompt comprises a first set of words;
   receiving, from an image-to-text generator in response to providing the first image to the image-to-text generator, a text description of the first image, wherein the text description describes visual content of the first image and comprises a subset of words that are not in the first set of words;
   selecting, for inclusion in a second text prompt, a second set of words from (i) the first set of words included in the initial text prompt and (ii) the subset of words included in the text description of the first image;
   modifying the second text prompt in response to user input;
   submitting the modified second text prompt to the automated text-to-image generator; and
   receiving a second image generated by the automated text-to-image generator from the modified second text prompt.

2. The method of claim 1, wherein the first image is received with a plurality of images generated by the automated text-to-image generator from the initial text prompt.

3. The method of claim 2, wherein the subset of words describe visual features represented by each image of the plurality of images.

4. The method of claim 2, further comprising:
   receiving a selection of the first image from the plurality of images, wherein the text description is received in response to the selection of the first image.

5. The method of claim 1, further comprising:
   displaying an alternative word related to a word in the second text prompt and an option to replace the word in the second text prompt with the alternative word, wherein the second text prompt is modified in response to receiving a selection of the option.

6. The method of claim 1, wherein generating the second text prompt comprises displaying the subset of words and an option to add one or more words from the subset of words to the initial text prompt or replace a word in the initial text prompt with the one or more words from the subset of words.

7. The method of claim 1, wherein the first set of words describe visual features represented by the first image, and the automated text-to-image generator uses the first set of words to generate the visual features in the first image.

8. The method of claim 1, wherein the first image is generated by the automated text-to-image generator using a latent diffusion model.

9. The method of claim 1, wherein the first set of words represent instructions to modify an initial image, and the first image is further generated by modifying the initial image based on the instructions.

10. The method of claim 1, further comprising:
    receiving a second text description of the second image, wherein the second text description comprises a second subset of words that are not in the modified second text prompt.

11. The method of claim 1, wherein selecting the second set of words comprises selecting, from the subset of words included in the text description of the first image, words describing visual content of the first image that does not correspond to content described in the initial text prompt.

12. The method of claim 1, wherein the image-to-text generator generates the text description of the first image by extracting features from the first image, wherein the text description includes a sequence of words describing the extracted features.

13. A method of automated text-to-image generation, the method comprising:
    receiving a first image generated by an automated text-to-image generator from an initial text prompt, wherein the initial text prompt comprises a first set of words, wherein;
       the first set of words describe visual features represented by the first image; and
       the visual features include visual content, visual styles, and visual perspectives generated by the automated text-to-image generator; and
       the automated text-to-image generator uses the first set of words to generate the visual features in the first image;
    receiving, from an image-to-text generator in response to providing the first image to the image-to-text generator, a text description of the first image, wherein the text description comprises a subset of words that are not in the first set of words;
    generating a second text prompt comprising a second set of words selected from (i) the first set of words and (ii) the subset of words, wherein the subset of words are selected from a category of words that describe the visual content, the visual styles, or the visual perspectives generated by the automated text-to-image generator;
    modifying the second text prompt in response to user input;
    submitting the modified second text prompt to the automated text-to-image generator; and
    receiving a second image generated by the automated text-to-image generator from the modified second text prompt, wherein the automated text-to-image generator uses the first set of words to generate the visual features in the first image.

14. A computer system for generating images from text, the computer system comprising:
    one or more processors; and
    one or more memories storing computer-readable instructions that, upon execution by at least one of the one or more processors, configure the computer system to perform operations comprising:
       receiving a first image generated by an automated text-to-image generator from an initial text prompt, wherein the initial text prompt comprises a first set of words;
       receiving, from an image-to-text generator in response to providing the first image to the image-to-text generator, a text description of the first image, wherein the text description describes visual content of the first image and comprises a subset of words that are not in the first set of words;

selecting, for inclusion in a second text prompt, a second set of words from (i) the first set of words included in the initial text prompt and (ii) the subset of words included in the text description of the first image;

modifying the second text prompt in response to user input;

submitting the modified second text prompt to the automated text-to-image generator; and receiving a second image generated by the automated text-to-image generator from the modified second text prompt.

15. The computer system of claim 14, wherein the execution of the computer-readable instructions further configures the computer system to provide a user interface to an electronic device, wherein the user interface is configured to receive the initial text prompt and the user input from a user of the electronic device, and the computer system and the electronic device are communicably coupled via one or more networks.

16. The computer system of claim 15, wherein the execution of the computer-readable instructions further configures the computer system to cause the user interface to display the first image and the second image to the user.

17. The computer system of claim 15, wherein the execution of the computer-readable instructions further configures the computer system to cause the user interface to display the subset of words and an option to add one or more words from the subset of words to the initial text prompt or replace a word in the initial text prompt with the one or more words from the subset of words.

18. The computer system of claim 15, wherein the user interface is further configured to access an initial image on the electronic device, and the first image is generated by modifying the initial image based on the initial text prompt.

19. One or more non-transitory computer-readable storage media storing instructions that, upon execution on a computer system, cause the computer system to perform operations comprising:

receiving a first image generated by an automated text-to-image generator from an initial text prompt, wherein the initial text prompt comprises a first set of words;

receiving, from an image-to-text generator in response to providing the first image to the image-to-text generator, a text description of the first image, wherein the text description describes visual content of the first image and comprises a subset of words that are not in the first set of words;

selecting, for inclusion in a second text prompt, a second set of words from (i) the first set of words included in the initial text prompt and (ii) the subset of words included in the text description of the first image;

modifying the second text prompt in response to user input;

submitting the modified second text prompt to the automated text-to-image generator; and receiving a second image generated by the automated text-to-image generator from the modified second text prompt.

20. The one or more non-transitory computer-readable storage media of claim 19, wherein:

the first image is received with a plurality of images generated by the automated text-to-image generator from the initial text prompt;

the operations further comprise receiving a selection of a subset of the plurality of images including the first image;

the subset of words describe visual features represented in each image of the subset of the plurality of images; and the text description is received in response to the selection of the subset of the plurality of images.

\* \* \* \* \*